United States Patent [19]

Heath

[11] Patent Number: 5,775,708

[45] Date of Patent: Jul. 7, 1998

[54] EXERCISE VEHICLE WITH CABLE STEERING SYSTEM

[76] Inventor: Steven C. Heath, 715 NE. 152nd Ave., Vancouver, Wash. 98684

[21] Appl. No.: 537,644

[22] Filed: Oct. 2, 1995

[51] Int. Cl.⁶ .................................................. B62M 1/12
[52] U.S. Cl. .................. 280/234; 280/224; 280/270
[58] Field of Search .......................... 280/233, 234, 280/220, 221, 223, 224, 270, 263, 267

[56] References Cited

U.S. PATENT DOCUMENTS

| | | | |
|---|---|---|---|
| 169,774 | 11/1875 | Bodel et al. | 280/233 |
| 664,231 | 12/1900 | Andreen | 280/233 |
| 1,796,682 | 3/1931 | Bell . | |
| 3,666,292 | 5/1972 | Bartos | 280/234 |
| 3,760,905 | 9/1973 | Dower . | |
| 3,895,825 | 7/1975 | Sink . | |
| 4,082,265 | 4/1978 | Berkes . | |
| 4,417,742 | 11/1983 | Intengan . | |
| 4,437,677 | 3/1984 | Ksayian . | |
| 4,548,420 | 10/1985 | Patroni, Jr. . | |
| 4,632,414 | 12/1986 | Ellefson . | |
| 4,639,007 | 1/1987 | Lawrence . | |
| 4,700,962 | 10/1987 | Salmon . | |
| 4,705,284 | 11/1987 | Stout | 280/242 |
| 4,733,880 | 3/1988 | Wilhelm, III . | |
| 4,796,907 | 1/1989 | Geller . | |
| 4,928,986 | 5/1990 | Carpenter . | |
| 4,941,673 | 7/1990 | Bennett . | |
| 5,002,298 | 3/1991 | Motto | 280/233 |
| 5,039,122 | 8/1991 | Deutch et al. . | |
| 5,054,770 | 10/1991 | Bull . | |
| 5,082,302 | 1/1992 | Nacar . | |
| 5,209,506 | 5/1993 | Klopfenstein . | |
| 5,242,179 | 9/1993 | Beddome et al. | 280/233 |
| 5,280,936 | 1/1994 | Schmidlin . | |
| 5,368,321 | 11/1994 | Berman et al. . | |
| 5,372,374 | 12/1994 | Hudson . | |
| 5,511,810 | 4/1996 | Tong | 280/233 |

FOREIGN PATENT DOCUMENTS

| | | |
|---|---|---|
| 423119 | 7/1947 | Italy . |
| 481505 | 6/1953 | Italy . |

*Primary Examiner*—Brian L. Johnson
*Assistant Examiner*—Avraham Lerner
*Attorney, Agent, or Firm*—Kolisch, Hartwell, Dickinson, McCormack & Heuser

[57] ABSTRACT

An exercise vehicle is provided with an improved push/pull cable steering system for use in directing vehicle travel without interfering significantly with vehicle power. The vehicle includes a frame with a drive system attached thereto and includes at least one drive wheel coupled with the frame. Preferably, the drive system includes arm levers operatively connected to the drive wheel so that counter-reciprocal movement of the arm levers produces rotation of the drive wheel. The steering system includes a guidance wheel rotatably coupled with the frame, an elongate steering crank which is operatively coupled with the guidance wheel, hand levers pivotally attached to the arm levers and push/pull cabling assemblies connecting the hand levers to the steering crank. When one hand lever pivots, the steering crank rotates, causing the other hand lever to pivot in the same direction of rotation while the freely rotatable ends of the hand levers move in opposite translational directions, and causing the guidance wheel to turn.

20 Claims, 4 Drawing Sheets

5,775,708

1

EXERCISE VEHICLE WITH CABLE STEERING SYSTEM

TECHNICAL FIELD

The present invention relates generally to exercise vehicles, and more particularly, to a steering system for use in a vehicle which is propelled at least partially by action of a rider's arms. Although the invention has broad utility, it has proven especially well suited for use in the context of a modified bicycle, particularly where such bicycle is propelled by simultaneous reciprocation of the rider's arms and legs. Such a vehicle provides unique challenges related to both balance and steering, and thus serves as an excellent example by which the present invention may be described.

BACKGROUND ART

A conventional bicycle is essentially a two-wheeled vehicle powered by a rider using foot pedals which drive the bicycle's rear wheel. The bicycle's front wheel is used for steering, the front wheel generally being directed by a handlebar which is mounted on the bicycle's front fork. A bicycle thus may be considered to be a "human-powered" vehicle which advantageously conserves non-replaceable fuels and electricity. Other transportation devices, such as tricycles, wheelchairs and even scooters, provide similar advantages over vehicles driven by, for example, internal combustion engines.

Another important advantage offered by "human-powered" vehicles is that such vehicles provide exercise for the rider, improving health and fitness of the populous. Other activities, such as running and jogging, also provide exercise, but are difficult on the back, legs, feet and joints. Cycling avoids the jarring effect of running or jogging, but requires high speeds or long distances to achieve truly beneficial aerobic exercise. None of these activities provide meaningful upper body exercise. What is needed is a vehicle which provides aerobic benefit even at low speeds, and which provides the rider with an upper body workout. This may be accomplished by using simultaneous arm and leg movements to propel the vehicle.

Although some vehicles are known to utilize both the arms and legs to produce propulsion, these vehicles tend to utilize the power of the human body in an inefficient manner. Power typically is applied only in surges, and when such power is applied, the muscles are active in only one direction. One example of such a vehicle is U.S. Pat. No. 5,280,936 to Schmidlin. This vehicle has a complex and expensive arrangement of chains, rollers, and sprockets.

One problem which is common to "human-powered" vehicles which employ both the arms and legs to propel the vehicle relates to steering, an operation which may be complicated by use of the rider's arms. The most common type of steering system, for example, is a handlebar-based system which requires an arcuate movement of the rider's arms about a central axis. This is impractical, however, where the arms act as the vehicle's propulsion engine. U.S. Pat. No. 5,280,936 to Schmidlin, for example, describes an arm and leg rowing-like propulsion system with a handlebar steering system. The handlebar is attached to a drum around which a flexible cable is wrapped. When the rider turns the handlebar, the drum rotates, moving the cable and turning the front fork of the vehicle so that the vehicle can change its direction of travel. It will be understood that this arrangement makes it difficult for the rider to turn the handlebars smoothly due to the surging nature of the propulsion arrangement.

2

DISCLOSURE OF THE INVENTION

The invented exercise vehicle solves the aforementioned problems by introduction of a "human-powered" vehicle which employs an improved push/pull cabling steering system. The vehicle includes a frame, a drive system attached thereto, at least one drive wheel rotatably coupled with the frame to effect propulsion of the vehicle, and a steering system which is also attached to the frame. The vehicle's drive system includes a pair of counter-reciprocal arm levers, which project generally upwardly from the frame within arm's reach of the rider. The arm levers transfer motion to the drive wheel, simultaneous movement of the arm levers producing corresponding rotation of the drive wheel. In the preferred embodiment, the arm levers are connected to foot platforms so that the rider may propel the vehicle with simultaneous arm and leg motions.

The vehicle's steering system includes a pair of hand levers which are pivotally attached to the arm levers, each hand lever being grasped by one of the rider's hands. The hand levers, in turn, control a guidance wheel which is coupled with the vehicle's frame. The guidance wheel is configured both to roll on a surface and to rotate left or right to effect a change in the direction of vehicle travel. An elongate steering crank is attached to the guidance wheel so that the wheel turns when the crank rotates around a vertical axis. Push/pull cabling assemblies connect the crank and to the hand levers. A rider thus may turn the vehicle right or left by pivoting one of the hand levers in the appropriate direction. When a hand lever pivots, the steering crank rotates, causing the other hand lever to correspondingly pivot. The rider thus is able to maintain full and effective power because the rider's arms remain in the same vertical plane, whether the vehicle is traveling through a turn, or in a straight line.

These and other advantages and objects of the present invention will be more readily understood after a consideration of the drawings and the detailed description of the preferred embodiment which follows.

BRIEF DESCRIPTION OF THE DRAWINGS

FIG. 4 is a fragmentary, top plan view of the front end of the exercise vehicle of FIG. 1 during a turn, the vehicle's arm levers and foot platforms having been removed for the sake of clarity.

FIG. 6 is a fragmentary, side elevation view of the angle-adjustment mechanism of FIG. 5.

DETAILED DESCRIPTION AND BEST MODE FOR CARRYING OUT THE INVENTION

The preferred embodiment of the invented exercise vehicle is shown in FIGS. 1–8, such vehicle being indicated generally at 10. In describing the preferred embodiment, directional terms are used, such as left, right, up, down, upward, downward, front, rear, forward, rearward, etc. These directional terms are based on a human rider's frame of reference and presumes a direction of travel of the vehicle in the direction that the rider faces. The reference designators for matching elements of the vehicle include letters to indicate the side of the vehicle to which it is attached. The letter "l" indicates the left side and the letter "r" indicates the right side. "Down" and "downward" mean generally toward the surface on which the vehicle travels and "up" and "upward" mean generally away from the surface on which the vehicle travels. "Forward" and "front" mean generally the direction in which the rider faces and "rearward" and "rear" are generally the opposite thereof. Also, "turning the vehicle" means changing the direction of travel of the vehicle to the right or left.

Figure 1:
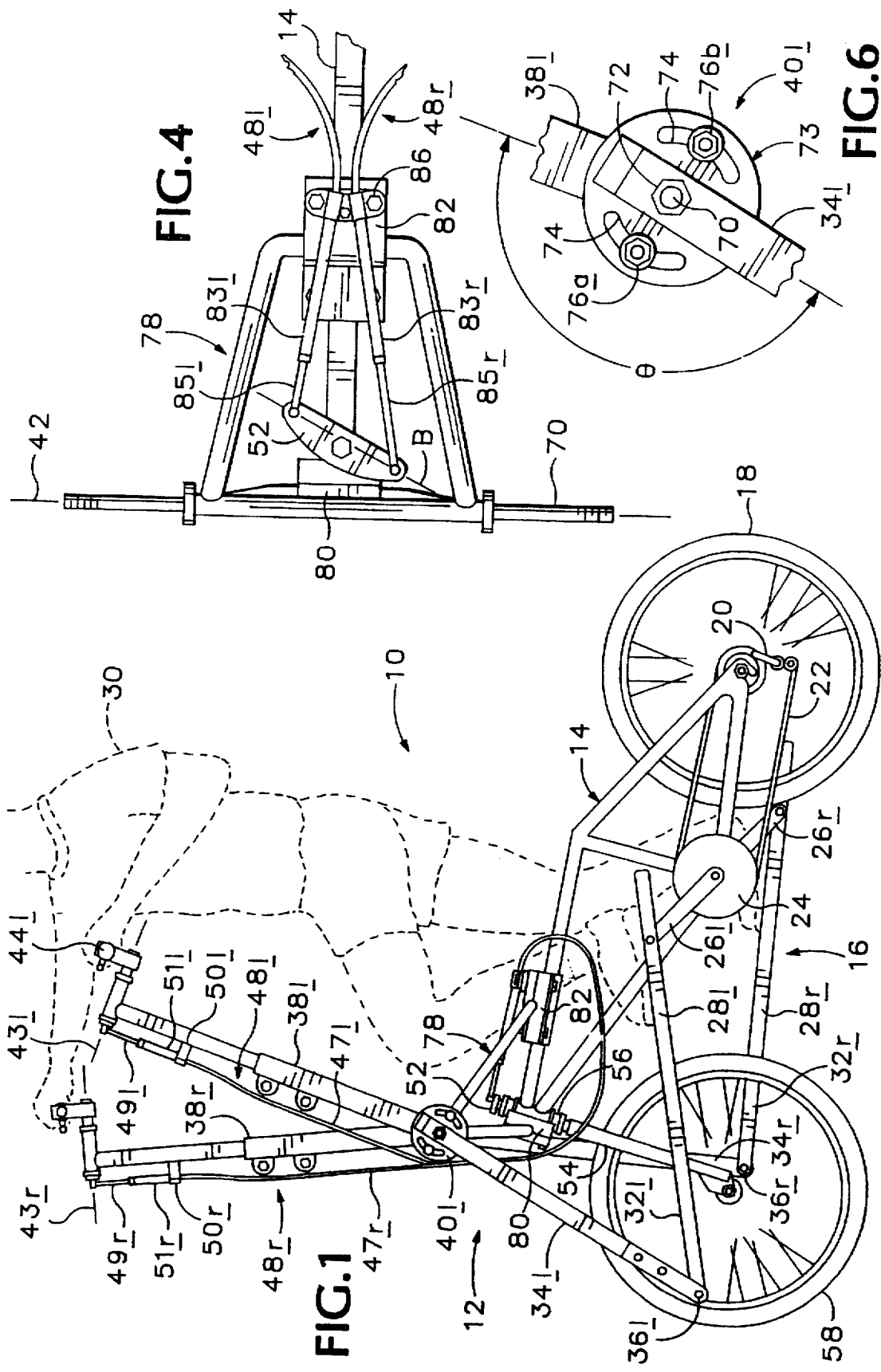
FIG. 1 is a side elevation view of an exercise vehicle, constructed in accordance with a preferred embodiment of the invention, a human rider being shown in phantom lines.
Figure 2:
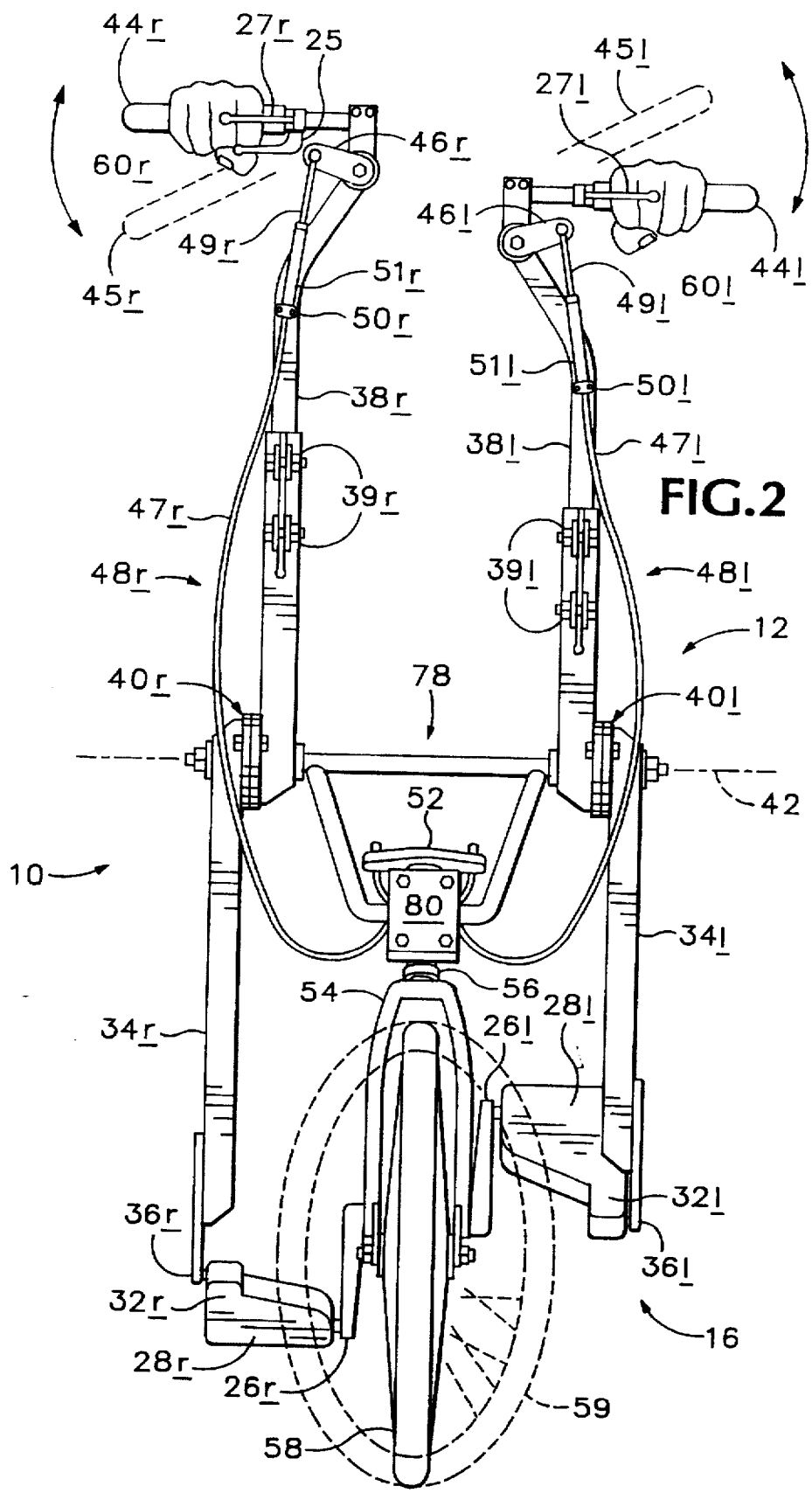
FIG. 2 is a front elevation view of the exercise vehicle of FIG. 1, the hand levers and wheel being shown alternatively in phantom lines to illustrate their positions during a turn.

As shown in FIGS. 1 and 2, exercise vehicle 10 includes a frame 14, a steering system 12 and a drive system 16, each of these components borrowing basic principles from the design of a conventional bicycle. Frame 14, in fact, is selected to be a frame of the same type used on a standard bicycle. Drive system 16 includes rear drive wheel 18 which is rotatably connected to the rear portion of the frame, and employs the following components which are standard on a conventional bicycle: a transmission 20, a chain 22, a crank wheel 24, right and left crank rods 26r, 26l, gear shifter 25 and right and left brake levers 27r, 27l. Unlike a conventional bicycle, however, the depicted exercise vehicle has foot platforms 28r, 28l which replace conventional pedals. Unlike pedals, the foot platforms support the entire foot of the rider.

Right and left crank rods 26r, 26l are rotatably mounted to the lower portion of frame 14. Right and left foot platforms 28r, 28l are pivotally connected to respective crank rods 26r, 26l. A conventional method of conveying rotational force from the crank rods to the drive wheel is provided via multi-geared transmission 20. Preferably, when the rider is propelling the vehicle, the foot platforms move in an elliptical or circular fashion. Right and left platform extensions 32r, 32l protrude forwardly from respective foot platforms 28r, 28l.

A rider 30 is shown in phantom lines in FIG. 1 with the rider's feet on foot platforms 28r, 28l. Rider 30 propels the vehicle using the foot platforms in a manner somewhat similar to pedalling of a bicycle, the principle differences being that each foot platform is large enough to support the rider's entire foot and that the rider is operating the vehicle in a standing position. Of course, those who are skilled in the art will understand that the vehicle may provide a seat for the rider and the rider may operate the vehicle in a seated position.

The forward ends of platform extensions 32r, 32l are pivotally attached to respective right and left lower arm portions 34r, 34l at attach points depicted by right and left lower pivots 36r, 36l. The two arm levers are formed from the rigid connection of upper arm portion 38r, 38l to corresponding lower arm portion 34r, 34l by angle-adjustment mechanisms 40r, 40l at center pivot axis 42. The arm levers are configured for adjustment to accommodate different size riders using angle-adjustment mechanism 40. The lower and upper arm portions may, for example, be rigidly connected to one another at an angle which changes the rider's range of motion during back-and-forth movement of the arm levers. In the preferred embodiment, each arm lever also is telescoping so that the height of the arm lever may be adjusted to accommodate the physical differences of each rider. Height-adjustment clamps 39r, 39l fix the height of the telescoping arm levers.

A pair of hand levers 44r, 44l (i.e., handles) are pivotally attached to the end of each arm lever. Preferably, the hand levers are covered with a cushioning material (such as foam rubber, plastic or leather) to facilitate the rider's grip. Preferably, to propel the vehicle, the rider grasps each hand lever and simultaneously moves the arm levers back and forth in the opposite directions from one another (i.e., in a counter-reciprocal fashion).

Figure 3:
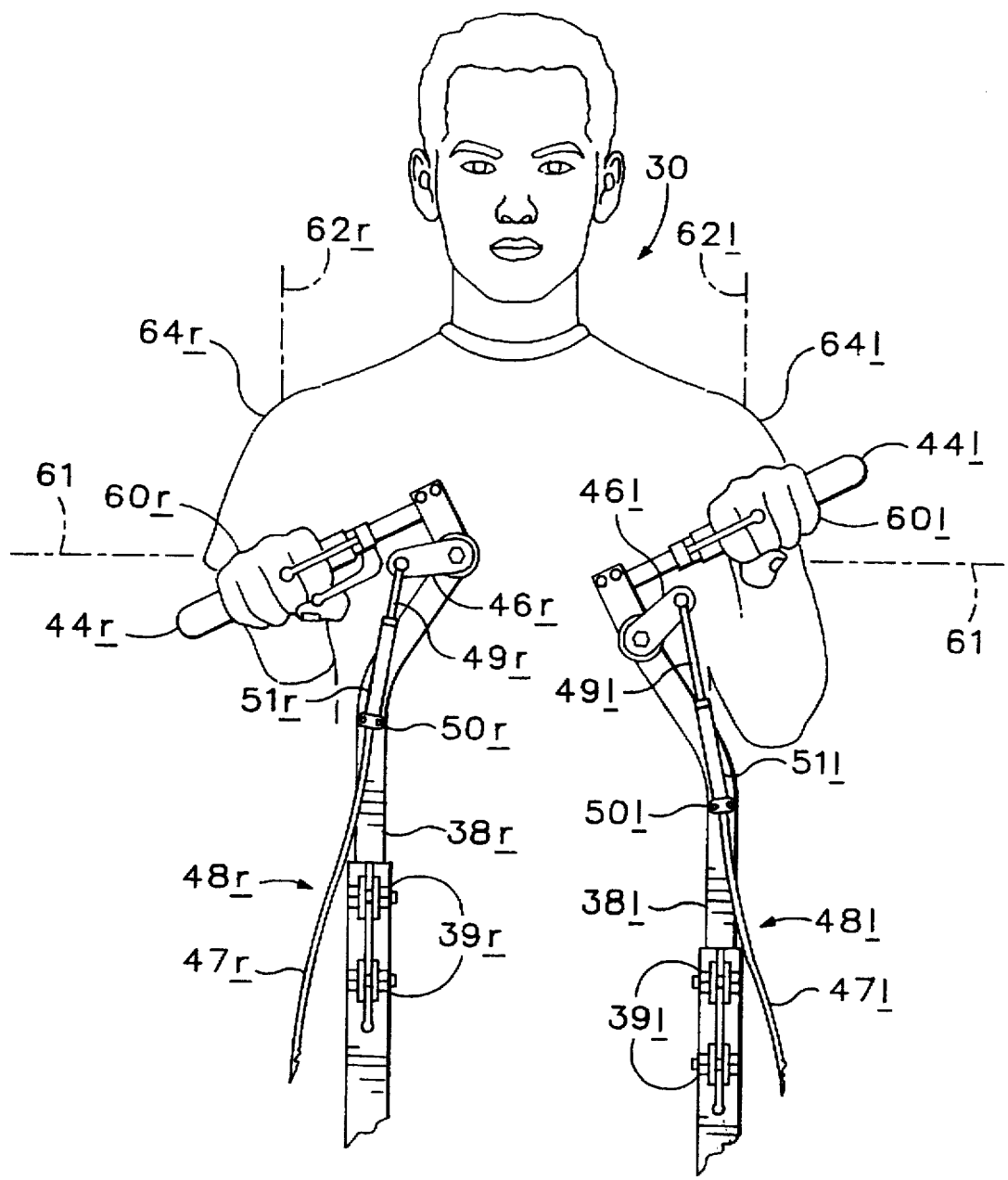
FIG. 3 is a simplified, fragmentary front elevation view of the exercise vehicle which shows the hand levers and the rider's upper body during a turn.

The reader's attention now is directed to steering system 12, which is shown in its preferred form in FIGS. 3 and 4. As indicated, the steering system includes hand levers 44r, 44l which are pivotally attached to the tops of corresponding upper arm portions, each hand lever preferably being configured to pivot up or down about a corresponding hand-lever axis 43r, 43l (see FIG. 1). Each axis is defined as being normal to the longitudinal axis of its corresponding upper arm portion. Hand lever cranks 46r, 46l are rigidly connected to the hand levers and pivot about the same hand-lever axis. When a hand lever pivots up, its corresponding hand lever crank pivots up, and vice versa. When a hand lever pivots down, its corresponding hand lever crank pivots down, and vice versa.

The rider initiates a change in the direction of vehicle travel by pivoting one or both of the hand levers up or down. This action causes the connected hand lever crank to pivot in the same direction. The force of pivoting a hand lever is propagated further by push/pull cabling assemblies 48r, 48l, which are attached to corresponding hand lever cranks.

As shown in FIGS. 1–4, the push/pull cabling assemblies include stiff upper rods 49r, 49l connected to corresponding hand lever cranks. The cabling assemblies further include rigid upper tubes 51r, 51l in which the corresponding rods are at least partially sheathed. Inside of upper tubes 51r, 51l, the rods are connected to stretch-resistant, force-communicative cables (not shown). The push/pull cabling assemblies also include stiff lower rods 85r, 85l connected to opposite ends of steering crank 52. Rigid lower tubes 83r, 83l at least partially sheath the corresponding rods. Inside of lower tubes 83r, 83l, the rods are connected to the stretch-resistant, force-communicative cables.

Preferably, the cables are composed of material which is stretch-resistant and force-communicative so that the cables will not deform or stretch when pushed or pulled and so that the cables can communicate the pushing/pulling force of the pivoting hand lever to other steering system components (i.e., the steering crank). In the preferred embodiment, each cable is enclosed in a flexible sleeve and is free to move within its sleeve. In FIGS. 1–4, 7 and 8, the sleeved cables are shown at 47r, 47l. To prevent these cable assemblies from hanging loose, their sleeves and tubes are attached to the arm levers by upper cable clamps such as those shown at 50r and 50l. In the preferred embodiment, the cabling assemblies cross before connecting to the steering crank. Thus, in FIG. 4 cabling assembly 48r is on the left side of the vehicle and cabling assembly 48l is on the right side of the vehicle.

The pushing and pulling force is communicated via the cables to an elongate steering crank 52 so that the steering crank rotates about a vertical axis A (i.e., an axis perpendicular to its longitudinal axis B). The steering crank is connected at or near its midpoint to front fork 54 through head tube 56. Front fork 54 mounts front guidance wheel 58. When the steering crank rotates left or right, the guidance wheel turns in the same direction, thereby changing the direction of travel of the vehicle.

In addition to turning the guidance wheel left or right, rotation of the steering crank pulls one cabling assembly while pushing the other cabling assembly. When the rider pulls up on hand lever 44*l*, cabling assembly 48*l* will pull on one end of the steering crank. When cabling assembly 48*l* pulls on one end of steering crank 52, the steering crank rotates and pulls on cabling assembly 48*r*. Such action urges hand lever 44*r* to pivot downward. In FIG. 4, steering crank 52 is shown rotated to the right. When in this position, the guidance wheel also is turned to the right (the guidance wheel is not shown in FIG. 4).

FIG. 2 shows, in solid lines, the hand levers horizontal and the guidance wheel in a straight position. In phantom lines, hand levers 45*r*, 45*l* are shown in an orientation which would produce a right-hand turn. The resulting right-hand turn of the guidance wheel is shown in phantom lines 59.

Using the vehicle's steering system, a rider may effectively steer the vehicle while maintaining efficient power produced by the counter-reciprocal action of the arm levers. An attempt is made to keep each of the rider's arms in or near a vertical plane which extends from a corresponding shoulder in the direction of travel. When this is accomplished, the rider's arms produce more power during back-and-forth action, the arms being more efficient.

The preferred embodiment of the invented vehicle limits the extent to which a rider's arms leave the corresponding vertical planes of the shoulders. FIG. 3 shows a rider performing a right-hand turn. Hand lever 44*r* pivots downwardly and hand lever 44*l* pivots upwardly. However, each of the rider's hands 60*r*, 60*l* (and the rider's arms) remain in or near a vertical plane 62*r*, 62*l* which extends in a direction of travel from a corresponding shoulder 64*r*, 64*l*. Similarly, because the hand-lever axes are independent, and generally in alignment with the rider's shoulders and arms, the rider's hands will remain substantially near an optimal horizontal plane 61, even during a turn. Therefore, the rider is able to maximize power during a vehicle turn.

Figure 5:
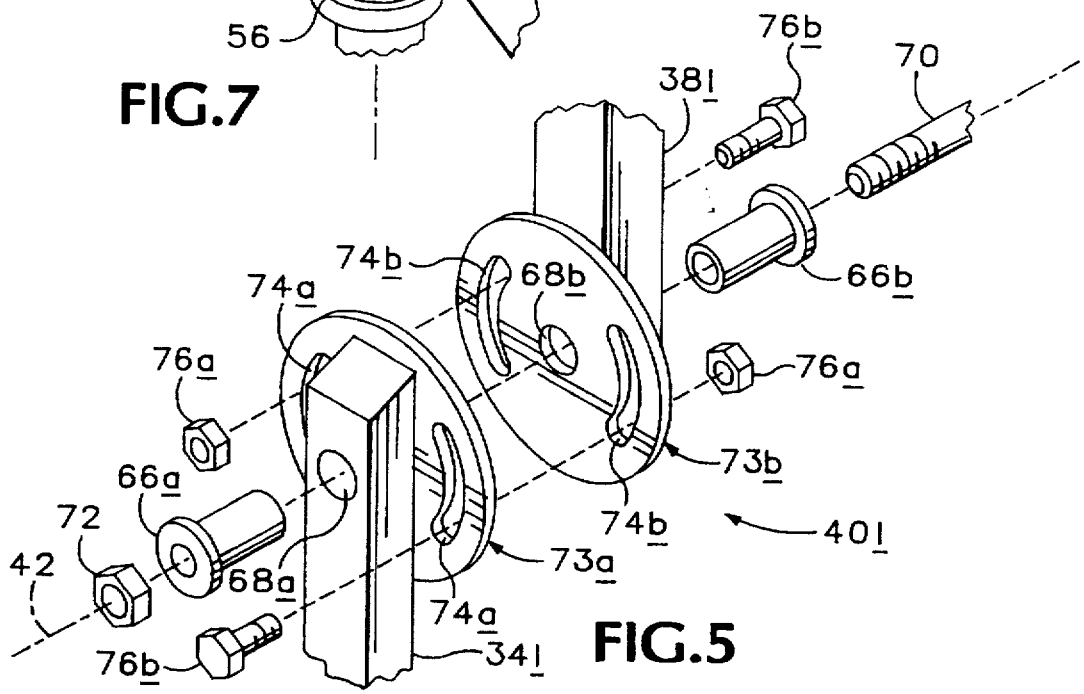
FIG. 5 is a fragmentary, exploded, isometric view of an angle-adjustment mechanism of the left arm lever from the exercise vehicle of FIG. 1.

The reader's attention is now directed to angle-adjustment mechanism 40*l* which is shown in FIGS. 5 and 6. As indicated, the lower and upper arm portions are adjustably connected via angle-adjustment mechanism 40*l*. Each upper arm portion upwardly projects from said frame at a projection angle θ relative to the lower arm portion. Angle θ is adjustable about center pivot axis 42. This adjustment accommodates for the variable arm lengths of the individual riders. Also, the angle-adjustment mechanisms 40*l* and 40*r* allow upper arm portions 38*l* and 38*r* to be folded (i.e., collapsed) to accommodate storage of the vehicle.

Sleeves 66*a*, 66*b* are inserted through holes 68*a* and 68*b* in the arm levers. Pivot rod 70 extends through the sleeves and pivot rod nut 72 fastens the arm levers to the pivot rod so that the arm levers pivot about pivot axis 42. The upper and lower arms each include a circular flange 73*a*, 73*b* having matching adjustment apertures 74*a*, 74*b*. A nut-and-bolt set 76*a*, 76*b* through each pair of matching apertures 74 secures the position of the angle-adjustment mechanism 40 and thus, fix projection angle θ of the upper arm portion during exercise vehicle use.

Figure 8:
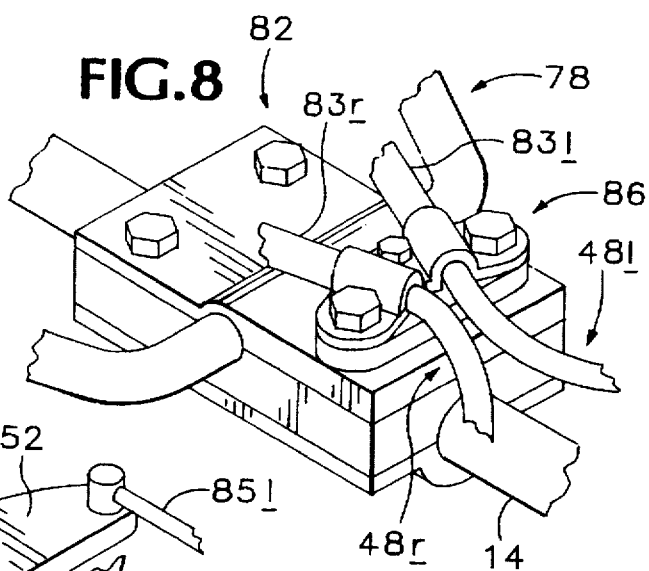
FIG. 8 is a fragmentary, isometric view of a second clamp assemblage of the vehicle shown in FIG. 1, the second clamp assemblage being used to further secure the subframe to the frame.
Figure 7:
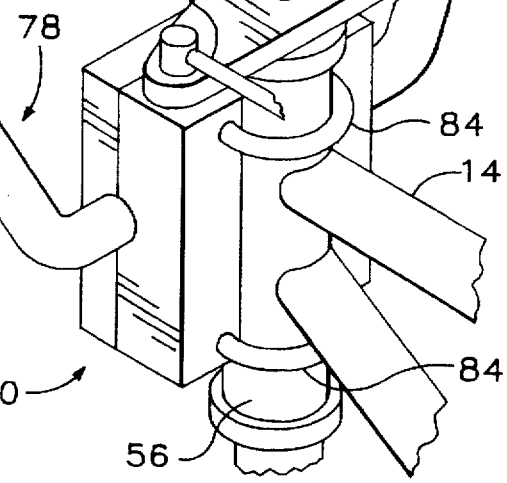
FIG. 7 is a fragmentary, isometric view of a first clamp assemblage of the exercise vehicle shown in FIG. 1, the first clamp assemblage being used to secure at least a portion of the subframe to the frame.

FIGS. 4, 7 and 8 illustrate a mounting arrangement including a pivot-axis subframe 78, a head mounting assemblage 80 and frame mounting assemblage 82. Using this mounting arrangement, a conventional bicycle may be modified or retrofitted in accordance with the invention. Bicycle pedals are replaced by the foot platforms 28. Handlebars are replaced by hand levers, arm levers and a steering crank. Pivot-axis subframe 78 is mounted to the bicycle by head mounting assemblage 80 and frame mounting assemblage 82. The pivot-axis subframe holds pivot rod 70, to which the arm levers are pivotally attached. The front of pivot-axis subframe 78 is supported by head mounting assemblage 80. FIG. 7 shows head mounting assemblage 80 attached to head tube 56 via U-bolts 84. The head mounting assemblage includes two pieces which are tightened or clamped around a front portion of pivot-axis subframe 78. FIG. 8 shows frame mounting assemblage 82 clamped around frame 14 and a rear portion of pivot-axis subframe 78. The frame mounting assemblage has a small lower cable clamp 86 for holding and aligning cabling assemblies 48*r*, 48*l*.

Those who are skilled in the art will appreciate and understand that modifications may be made to the preferred embodiment of the invented vehicle and steering system without departing from the spirit and scope of the invention. For example, the vehicle may have two, three, four or more wheels. One or more may be drive wheels and one or more may be guidance wheels. Also, the foot platforms may be replaced by foot rests so that the user produces power by back-and-forth arm motions only. The rider may also propel the vehicle while in a seated position. Also, the preferred embodiment of the vehicle may be modified such that an engine or a motor provides propulsion rather than a human rider.

While tooling about in the preferred embodiment exercise vehicle, the rider receives a full body aerobic exercise and maximizes the power and efficiency of the rider's arm and leg motions while executing a turn of the vehicle.

INDUSTRIAL APPLICABILITY

The invented exercise vehicle and steering system for such a vehicle may be understood to provide a transportation and/or exercise vehicle for a person. Such a vehicle utilizes the full power potential of the human body by using the simultaneous motion of the arms and legs to produce motion of the vehicle. The vehicle's system provides an easy and efficient system for steering such a vehicle. Furthermore, a standard bicycle may be modified to provide simultaneous arm and leg motion propulsion.

The exercise vehicle provides both aerobic and muscle-building exercise. It also better utilizes the human body as an engine by simultaneously using the rider's upper and lower body muscles. The exercise vehicle combines the powerful push and pull motion of the arms with the simultaneous and synchronized pedaling/climbing motion of the legs, thereby producing good upper body anaerobic exercise and good stair-climbing type aerobic exercise. The exercise vehicle exercises the entire body, even when a relatively short distance is traveled and when such travel is accomplished at slower speeds. Full body exercise that is smooth and shock free with minimum impact stress exerted on the muscles and joints is possible using the exercise vehicle.

The steering system of the vehicle does not interfere with propulsion. The rider remains in an upright standing position while propelling the vehicle, thereby enabling the rider to better see the surroundings, including approaching obstacles, and to better be seen by others who might be on a converging path. Continuous power is applied smoothly to the drive wheel, so that when the legs are providing the least power during the cycle, the arms are providing maximum power and vice versa. Also, the vehicle may be readily folded and thus, easily transported in an automobile.

While the preferred embodiment and best mode of the invention have been disclosed, variations and changes may be made without departing from the spirit and scope of the invention as claimed.

I claim:

1. A vehicle comprising:

a frame including first and second arm levers projecting generally upwardly from the frame within arm's reach of a rider;

at least one drive wheel rotatably coupled with said frame;

a drive system attached to said frame, the drive system for rotating said drive wheel; and a steering system including (a) a guidance wheel rotatably coupled with said frame, the guidance wheel being configured to roll on a surface about a rolling axis and to turn left or right to effect a directional change in vehicle travel; (b) an elongate steering crank operatively connected to the guidance wheel so that the guidance wheel turns when the steering crank rotates about an axis normal to a longitudinal axis of the steering crank; (c) a first hand lever pivotally attached to the first arm lever and having a freely rotatable end, and a second hand lever pivotally attached to the second arm lever and having a freely rotatable end; (d) a first cabling assembly connected between a first end of the steering crank and the first hand lever, and a second cabling assembly connected between a second end of the steering crank and the second hand lever so that when the first hand lever pivots, the second hand lever pivots in the same direction of rotation while the freely rotatable ends of the first and second hand levers move in opposite translational directions, respectively, pivot of the hand levers thus causing the steering crank to rotate, and correspondingly causing the guidance wheel to turn, thereby effecting a directional change in vehicle travel.

2. The vehicle of claim 1, wherein the first hand lever pivots about a first hand-lever axis which is normal to the first arm lever and the second hand lever pivots about a second hand-lever axis which is normal to the second arm lever such that when the vehicle is traveling in a straight direction, the rider's right shoulder and right hand are in a first vertical plane and the rider's left shoulder and left hand are in a second vertical plane, and further wherein the rider's shoulders and hands remain substantially in the same first and second vertical planes, respectively, while traveling through a left or right turn.

3. The vehicle of claim 1, wherein the first and second arm levers pivot in a counter-reciprocal fashion such that the rider pulls one arm lever toward the rider while pushing the other arm lever away and the drive system transfers such counter-reciprocal motion of the first and second arm levers into rotational motion of said drive wheel.

4. The vehicle of claim 1, wherein the drive system further includes first and second foot platforms pivotally attached to corresponding first and second arm levers so that the drive system transfers power produced by motion of the rider's arms and legs to said drive wheel, thereby rotating said drive wheel and propelling said vehicle.

5. The vehicle of claim 1, wherein each arm lever includes an upper arm portion and a lower arm portion connected via an angle-adjustment mechanism which defines a projection angle therebetween which may be adjusted to accommodate physical differences between individual riders so that the hand levers are comfortably within reach of an individual rider's arms.

6. The vehicle of claim 1, wherein the arm levers collapse to accommodate storage of the vehicle.

7. The vehicle of claim 1 which further comprises a pivot-axis subframe to which the arm levers pivotally attack, and at least one mounting assemblage configured for attachment to said frame and the pivot-axis subframne such that the at least one mounting assemblage rigidly connects the pivot-axis subframe to said frame.

8. The vehicle of claim 1, wherein the rider operates the vehicle primarily from a standing position.

9. The vehicle of claim 3, wherein the drive system further includes first and second foot platforms pivotally attached to corresponding first and second arm levers at respective points of attachment so that the drive system transforms power produced by motion of the rider's arms and legs, through a range of motion of the arm levers, to the drive wheel, thereby rotating the drive wheel and propelling the vehicle, and wherein the guidance wheel has a rolling axis and an outer circumference having an uppermost point, and further wherein the point of attachment of each foot platform to the corresponding arm lever is (a) in front of the rolling axis of the guidance wheel through at least part of the range of movement of the arm levers, and (b) below the uppermost point on the outer circumference of the guidance wheel throughout the range of movement of the arm levers.

10. A steering system for effecting direction of travel of an exercise vehicle, wherein the exercise vehicle includes a frame having right and left arm levers, the steering system comprising:

a guidance wheel pivotally coupled with the frame to turn left or right to effect a directional change in vehicle travel;

an elongate steering crank operatively connected to the guidance wheel so that the guidance wheel turns when the steering crank pivots about an axis normal to a longitudinal axis of said steering crank;

a right hand lever pivotally attached to the right arm lever and having a freely rotatable end, and a left hand lever pivotally attached to the left arm lever and having a freely rotatable end; and first and second push/pull cabling assemblies having first ends attached to opposite ends of said steering crank, the first push/pull cabling assembly having a second end attached to the right hand lever and the second push/pull cabling assembly having a second end attached to the left hand lever so that when one hand lever pivots, steering crank rotates, causing the other hand lever to pivot in the same direction of rotation while the freely rotatable ends of the first and second hand levers move in opposite translational directions, respectively, and causing guidance wheel to turn, thereby effecting a directional change in vehicle travel.

11. The steering system of claim 10 wherein each arm lever includes an upper portion and a lower arm portion connected via an angle-adjustment mechanism which defines a projection angle therebetween.

12. The steering system of claim 11, wherein the upper arm portions are telescoping.

13. An exercise vehicle having a frame which is steered and propelled by a rider and having at least one drive wheel rotatably coupled with the frame, the vehicle comprising:

a drive system attached to the frame, the drive system for propelling the vehicle by rotating the drive wheel, the drive system further including right and left arm levers which project generally upwardly from the frame within reach of the rider, the right and left arm levers being pivotal in counter-reciprocal fashion such that when one arm lever moves toward the rider the other arm lever moves away from the rider, the drive system being configured to translate counter-reciprocal motion of the right and left arm levers into rotational motion of the drive wheel, thereby propelling the vehicle; and a steering system including (a) a guidance wheel rotatably coupled with the frame, wherein the guidance wheel is configured to roll on a surface and to rotate left or right to effect a directional change in vehicle travel; (b) an elongate steering crank operatively coupled with the guidance wheel so that the guidance wheel turns when the steering crank rotates about an axis normal to a longitudinal axis of the steering crank; (c) a right hand lever pivotally attached to the right arm lever and having a freely rotatable end, and a left hand lever pivotally attached to the left arm lever and having a freely rotatable end; and (d) first and second stretch-resistant, force-communicative push/pull cabling assemblies having first ends attached to opposite ends of the steering crank, respectively the first push/pull cabling assembly having a second end which is attached to the right hand lever, and the second push/pull cabling assembly having a second end which is attached to the left hand lever so that when one hand lever pivots, the other hand lever pivots in the same direction of rotation while the freely rotatable ends of the first and second hand levers move in opposite translational directions, respectively, and the steering crank rotates, causing the guidance wheel to rotate left or right, thereby effecting a directional change in vehicle travel.

14. The vehicle of claim 13, wherein when the vehicle is traveling in a straight directions, the rider's right shoulder and right hand are in a first vertical plane and the rider's left shoulder and left hand are in a second vertical plane, and further wherein the rider's shoulders and hands remain substantially in the same first and second vertical planes, respectively, while traveling through a left or right turn.

15. The vehicle of claim 13, wherein the drive system further includes right and left foot platforms pivotally attached to the arm levers so that the drive system transfers power produced by motion of the rider's arms and legs to the drive wheel, thereby rotating the drive wheel and propelling the vehicle.

16. The vehicle of claim 13, wherein each arm lever projects upwardly at a projection angle defined by an angle-adjustment mechanism.

17. The vehicle of claim 13 which further comprises a pivot-axis subframe to which the arm levers pivotally attach, and at least one mounting assemblage configured for attachment to the frame and the pivot-axis subframe such that the at least one mounting assemblage rigidly connects the pivot-axis subframe to the frame.

18. The vehicle of claim 13, wherein the drive system further includes:

right and left foot platforms with platform extensions projecting in a fixed manner from each foot platform, each extension being pivotally joined with a corresponding arm lever such that motion of the rider's arms and legs causes at least part of each of the foot platforms to move elliptically; and a crank wheel rotatably coupled with the frame and attached to a pair of crank rods which are pivotally connected to the foot platforms, the crank rods transferring motion of the rider's legs and arms to the crank wheel such that the crank wheel rotates, wherein the drive wheel is operatively connected to the crank wheel such that rotation of the crank wheel effects rotation of the drive wheel to propel the vehicle.

19. An exercise vehicle having a frame which is steered and propelled by a rider and having at least one drive wheel rotatably coupled with the frame, the vehicle comprising:

a drive system attached to the frame, the drive system for propelling the vehicle by rotating the drive wheel, the drive system further including right and left arm levers which project generally upwardly from the frame within reach of the rider, the right and left arm levers being pivotal in counter-reciprocal fashion such that when one of the arm levers moves toward the rider, another of the arm levers moves away from the rider, the drive system being configured to translate counter-reciprocal motion of the right and left arm levers into rotational motion of the drive wheel, thereby propelling the vehicle; and a steering system including (a) a guidance wheel rotatably coupled with the frame, wherein the guidance wheel is configured to roll on a surface and to rotate left or right to effect a directional change in vehicle travel; (b) an elongate steering crank operatively coupled with the guidance wheel so that the guidance wheel turns when the steering crank rotates about an axis normal to a longitudinal axis of the steering crank; (c) a right hand lever pivotally attached to the right arm lever and a left hand lever pivotally attached to the left arm lever; and (d) first and second force-communicative push/pull cabling assemblies having first ends attached to opposite ends of the steering crank, respectively, the first push/pull cabling assembly having a second end which is attached to the right hand lever, and the second push/pull cabling assembly having a second end which is attached to the left hand lever, pivoting of at least one of the hand levers rotating the steering crank, causing the guidance wheel to turn, thereby effecting a directional change in vehicle travel.

20. An exercise vehicle having a frame which is steered and propelled by a rider and having at least one drive wheel rotatably coupled with the frame, the vehicle comprising:

a drive system attached to the frame and for propelling the vehicle by rotating the drive wheel, the drive system including right and left arm levers which project generally upwardly from the frame within reach of the rider, the right and left arm levers being pivotal in counter-reciprocal fashion such that when one of the arm levers moves toward the rider, another of the arm levers moves away from the rider, the drive system further including right and left foot platforms pivotally attached to the right and left arm levers, respectively, the right and left foot pedals moving in counter-reciprocal fashion with respect to each other, the drive system being configured to translate counter-reciprocal motion of the right and left arm levers and the right and left foot platforms into rotational motion of the drive wheel, thereby propelling the vehicle; and a steering system including (a) a guidance wheel rotatably coupled with the frame, wherein the guidance wheel is configured to roll on a surface and to rotate left or right to effect a directional change in vehicle travel; (b) an elongate steering crank operatively coupled with the guidance wheel so that the guidance wheel turns when the steering crank rotates about an axis normal to a longitudinal axis of the steering crank; (c) a right hand lever pivotally attached to the right arm lever and having a freely rotatable end, and a left hand lever pivotally attached to the left arm lever and having a freely rotatable end; and (d) first and second force-communicative push/pull cabling assemblies having first ends attached to opposite ends of the steering crank, respectively, the first push/pull cabling assembly having a second end which is attached to the right hand lever, and the second push/pull cabling assembly having a second end which is attached to the left hand lever so that when one hand lever pivots, the other hand lever pivots in the same direction of rotation while the freely rotatable ends of the first and second hand levers move in opposite translational directions, respectively, and the steering crank rotates, causing the guidance wheel to rotate left or right, thereby effecting a directional change in vehicle travel;

wherein the rider operates the vehicle primarily from a standing position; and wherein the first hand lever pivots about a first hand-lever axis which is normal to the first arm lever and the second hand lever pivots about a second hand-lever axis which is normal to the second aim lever such that when the vehicle is traveling in a straight direction, the rider's right shoulder and right hand are in a first vertical plane and the rider's left shoulder and left hand are in a second vertical plane, and further wherein the rider's shoulders and hands remain substantially in the same first and second vertical planes, respectively, while traveling through a left or right turn.

* * * * *